United States Patent [19]

Ogawa et al.

[11] Patent Number: 4,676,479
[45] Date of Patent: Jun. 30, 1987

[54] FLANGED VALVE

[75] Inventors: Hirotoshi Ogawa; Kazuhiko Tsuno, both of Nobeoka, Japan

[73] Assignee: Asahi Yukizai Kogyo Co., Ltd., Miyazaki, Japan

[21] Appl. No.: 790,251

[22] Filed: Oct. 22, 1985

[30] Foreign Application Priority Data

Jul. 4, 1985 [JP] Japan ................. 60-101142

[51] Int. Cl.[4] ................. F16K 51/00; F16L 23/02
[52] U.S. Cl. ..................... 251/151; 285/388
[58] Field of Search ............ 251/148, 367, 151; 285/387, 386, 388

[56] References Cited

U.S. PATENT DOCUMENTS

| | | | |
|---|---|---|---|
| 769,896 | 9/1904 | Gapp | 285/388 |
| 944,877 | 12/1909 | Koschinski | 285/388 |
| 4,372,529 | 2/1983 | Kato | 285/388 X |

FOREIGN PATENT DOCUMENTS

| | | |
|---|---|---|
| 30-127477 | 2/1955 | Japan . |
| 60-14063 | 5/1985 | Japan . |

Primary Examiner—Martin P. Schwadron
Assistant Examiner—Stephen M. Hepperle
Attorney, Agent, or Firm—Burns, Doane, Swecker & Mathis

[57] ABSTRACT

A valve body containing a ball valve member and having a threaded portion on the outer surface of an end portion thereof is connected with a body cap having a flange integral therewith on the outside end, by screwing a cap nut having an annular rib on the inner surface of the outside end thereof on the threaded portion of the valve body. A split ring is inserted into the space between the body cap and the cap nut. The split ring consists of two divided ring elements. Each ring element is provided with a fitting projection to be fitted into an annular groove of the body cap, on the inner surface of the outside end, and a collar-like projection is provided on the outer surface of the inside end. Both ends of the inner surface of the fitting projection of the ring element are cut off at the corners. The body cap is connected with the valve body by pushing the annular rib of the cap nut against the collar-like projection of the split ring and screwing the cap nut onto the threaded portion of the valve body.

4 Claims, 6 Drawing Figures

FLANGED VALVE

BACKGROUND OF THE INVENTION (1) Field of the Invention

The present invention relates to a flanged valve, more particularly to a flanged valve having flanges on the ends thereof for connection with pipes in a pipe line.

(2) Description of the Related Art

Flanged valves, especially flanged plastic gate valves connected with transport pipe lines for clean and sewage water, irrigated water, chemicals, foods and the like, are disclosed in Japanese Unexamined Utility Model Publication No. 56-127477 and Japanese Examined Utility Model Publication No. 60-14063.

In the flanged valve disclosed in the above Japanese Unexamined Utility Model Publication No. 56-127477, a body cap is provided with a flange integral therewith on the outer surface of an end thereof and provided with a plurality of projections on the outer surface of the other end thereof, a rib portion of a cap nut is provided with cut out portions allowing the projections to pass therethrough, thus the body cap and the cap nut can be engaged with each other.

In the flanged valve disclosed in the above Japanese Examined Utility Model Publication No. 60-14063, a body cap is provided with a flange integral therewith on the outer surface of an end thereof and provided with an annular groove on the outer surface adjacent to the other end thereof, and a cut out portion is provided on the outer surface of the body cap between the annular groove and the end face facing the valve body, while a split ring formed in a body and cut off at one point thereof is inserted into the annular groove from the cut out portion and thus engaged with the annular groove.

In the above flanged valves, each body cap having the flange integrally formed on the end thereof is engaged with the cap nut, and the cap nut is screwed on the outer surface of the valve body, thus these flanged valves are an improvement on the conventional flanged valves.

However, the above flanged valves have the following disadvantages.

In the flanged valve disclosed in Japanese Unexamined Utility Model Publication No. 56-12744, since the body cap and the cap nut when engaged are not in contact with the whole end surfaces of each other, the engaging strength between the body cap and the cap nut is decreased. In other words, the engaging strength between the body cap and the valve body is decreased. Further, manufacturing the projections and cut out portions is difficult.

In the flanged valve disclosed in Japanese Examined Utility Model Publication No. 60-14063, the engaging strength between the cap nut and body cap is increased. However, in order to fit the split ring into the annular groove, the large split ring must be flexed and deformed. Thus a special tool is required for this flexing and deforming, and assembling is difficult. Also, the same problems as mentioned above occur in the case of disassembling.

SUMMARY OF THE INVENTION

The object of the present invention is to provide a flanged valve in which engagement between a body cap having a flange integral therewith on an end thereof and a cap nut, i.e., engagement between a body cap and a valve body, can be strengthened, and assembling the body cap and the valve body can be facilitated.

According to the present invention, there is provided a flanged valve comprising; a valve body having a threaded portion on the outer surface of an end thereof and containing a valve member therein; a cylindrical body cap bearing, at the inside end thereof, on an open end of a passage of the valve body and provided with a flange integral therewith on the outer surface of an outside end thereof; a cap nut provided with an annular rib on the inner surface of the outside end thereof and having a threaded portion on the inner surface inside from the annular rib, the annular rib being fitted loosely on the outer surface of the body cap; the body cap being provided with an annular groove on the outer surface adjacent the inside end thereof; a split ring consisting of ring elements divided into at least two pieces is fitted into the annular groove, each ring element being provided, on the inner surface thereof, with a fitting projection which fits into the annular groove, both ends of the inner surface of the fitting projection being cut off at the corners of the portion facing the annular groove, each ring element further being provided with a collar-like projection having a diameter larger than the inner diameter of the annular rib of the cap nut, on the outer surface of the inside portion from the fitting projection thereof; whereby the body cap is connected with the valve body by pushing the annular rib of the cap nut against the collar-like projection of the split ring and by screwing the threaded portion of the cap nut on the threaded portion of the valve body.

According to a preferred embodiment, each ring element is provided with an annular groove on the outer surface of the fitting projection, and an O-ring is fitted into the annular groove of the ring element. The valve member contained within the valve body is a metallic or plastic ball valve, a ball check valve or a diaphragm valve. Especially preferably, all of these valve members are made of plastic.

DESCRIPTION OF THE PREFERRED EMBODIMENTS

Figure 1:
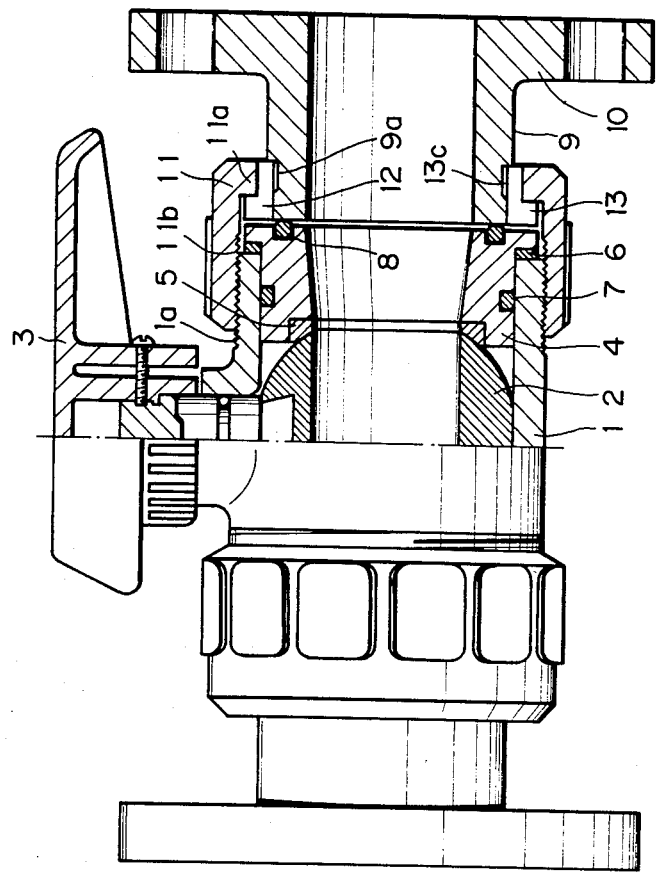
FIG. 1 is an elevational view of the first embodiment of the present invention, vertically sectioned at the right half thereof.
Figure 2:
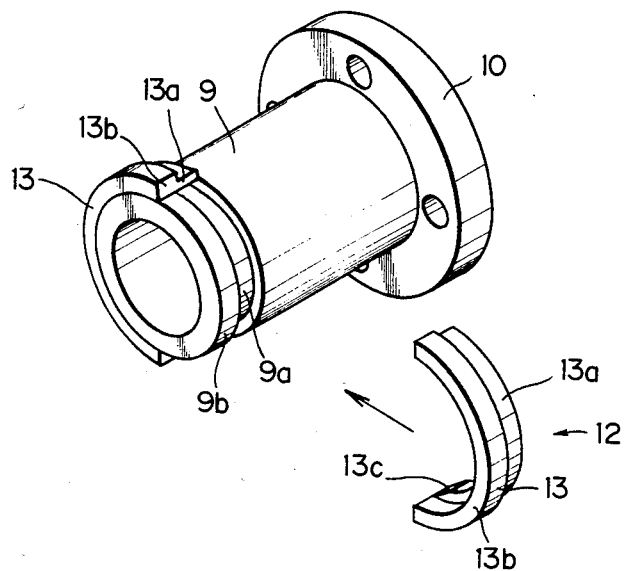
FIG. 2 is an exploded perspective view of the principal part of the above embodiment.

Preferred embodiments of the present invention will be described with reference to the accompanying drawings.

FIGS. 1 to 4 show a first embodiment of the present invention.

The flanged valve shown in the above Figures is a flanged ball valve made of plastic such as hard vinyl chloride resin. Numeral 1 represents a valve body, numeral 2 represents a ball valve member, numeral 3 represents a handle operated so as to move the ball valve member 2 to the opening and closing positions thereof, and numeral 4 represents a union inserted into the valve body 1. The union 4 is provided with an annular groove on the inside end thereof, i.e., the end of the union 4 closest to the ball valve member 2. A seat 5 in sliding contact with the ball valve member 2 is fitted into the annular groove of the union 4, and the outside end (the end furthest from the ball valve member 2) of the union 4 forms an open end of a passage of the valve body 1. Numeral 6 represents a seat gasket arranged between an end face of the valve body 1 and an outside rib of the union 4, and numeral 7 represents an O-ring fitted into an annular groove on the outer surface of the union 4.

At the other open end of the passage of the valve body 1, a union similar to the union 4 may be detachably inserted or this union may be formed as an integral part of the valve body 1.

Numeral 9 represents a body cap, which bears on the open end of the passage of the valve body 1, i.e., on the outside end of the union 4, via an O-ring 8. The body cap 9 is provided with a connecting flange 10 integral therewith on the outer surface of an end thereof to connect with pipe lines and fluid apparatuses. Since the flange 10 is formed integrally with the body cap, the connecting strength between the body cap 9 and the flange 10 is much higher than the connecting strength of such a combination formed by screwing or welding as in the prior art.

The body cap 9 is also provided with an annular groove 9a on the outer surface of the end opposite to the flange 10, i.e., on the outer surface adjacent to the end facing the valve body 1, a split ring 12 is fitted into the annular groove 9a.

Figure 3:
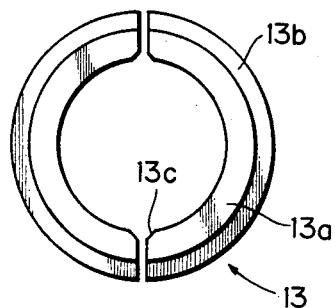
FIG. 3 is a side view of a split ring in the above embodiment.
Figure 4:
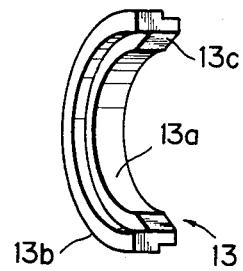
FIG. 4 is a perspective view of a ring element of the split ring.

The split ring 12 consists of separate ring elements 13, 13 divided into two pieces. These ring elements 13, 13 form a circular ring when placed opposite to each other. Each ring element 13 composing a split ring 12 is provided with a fitting projection 13a, on the inner surface of the outside end thereof, which fits into the annular groove 9a of the body cap 9, and is provided with a collar-like projection 13b integral therewith on the outer surface inside from the fitting projection 13a. Further, as shown in FIGS. 3 and 4, the fitting projection 13a is cut off at the corners of both ends of the portion facing the annular groove 9a so that notches 13c, 13c are formed at both ends of the fitting projection 13a. The inner surface of the collar-like projection 13b is formed so that it closely fits the outer surface of an end 9b of the body cap 9 which lies closer to the open end of the passage of the valve body 1 than the annular groove 9a. The outer diameter of the fitting projection 13a is smaller than the inner diameter of an annular rib 11a of a cap nut, which will be described hereinafter, but the outer diameter of the collar-like projection 13b is larger than the inner diameter of the annular rib 11a and is smaller than the inner diameter of a threaded portion 11b of the cap nut 11. The collar-like projections 13b, 13b form an annular collar as a whole body, when those two ring elements 13, 13 are fitted together into the annular groove 9a.

Numeral 11 represents a cap nut, which is screwed on a threaded portion 1a of the outer surface of the end portion of the valve body 1. The cap nut 11 is provided with an annular rib 11a molded integrally on the inner surface of the outside end thereof, and is provided with a threaded portion 11b which is screwed on the threaded portion 1a of the valve body 1, on the inner surface of the inside end thereof. The inner diameter of the annular rib 11a is larger than the outer diameter of the body cap 9.

In the above embodiment, the operation for connecting the cap nut 11 with the body cap 9, and in turn, connecting the body cap 9 with the valve body 1, is carried out as follows.

First, the cap nut 11 is positioned about the outer surface of the body cap 9 without fitting each ring element 13 into the annular groove 9a. Subsequently, the two ring elements 13, 13 are fitted into the annular groove 9a. In this fitting operation, since the ring element 13 has the notches 13c, 13c on the corners of both ends of the inner surface of the fitting projection 13a, the ring element 13 can be easily inserted into the annular groove 9a. That is, particularly in a valve having a large inner diameter, according to the construction of the above valve, since the longitudinal length of the cap nut 11 is a loose fit on the outer surface of the body cap 9 and is larger than the length of the body portion of the body cap 9, if the flange 10 is integrally provided on the outside end of the body cap 9, the inside end of the body cap 9 is located more deeply than the inside end of the cap nut 11. Therefore, when the ring elements 13, 13 are inserted into a space between the cap nut 11 and the body cap 9, the ring elements 13, 13 can not be inserted from the direction parallel to the inside end face of the body cap 9, thus they must be inserted obliquely downwards. In this case, according to this embodiment, since the notches 13c, 13c are provided on the corners of both ends of the inner surface of the ring element 13, the corners of both ends do not come into contact with the inside end face of the body cap 9, i.e., the end face of the body cap 9 closest to the ball valve member 2. Consequently, the ring elements 13, 13 are smoothly inserted together into the space between the cap nut 11 and body cap 9 and can be easily fitted into the annular groove 9a. On the contrary, if the ring element 13 is not provided with the notches 13c, 13c, even if the ring element 13 is to be inserted in the same manner as above, it can not be thus inserted because the corners of both ends of the inner surface are blocked by the inside end face of the body cap 9. If the ring element 13 is inserted more steeply, in order to be able to insert it into the space, it is difficult to fit the ring element 13 into the annular groove 9a of the body cap 9, and thus it becomes difficult to insert the ring element 13.

In this way, according to the present invention, since the ring element 13 need not be subjected to elastic deformation, deflection and the like, a tool for inserting same is not required.

As a result of fitting the ring elements 13, 13 into the annular groove 9a, the annular rib 11a of the cap nut 11 is able to move and rotate only between the flange 10 and the ring elements 13, 13. Then, the inside end face of the annular rib 11a and the outside end face of the collar-like projection 13b confront and engage each other over the whole of their peripheries, the inside end face of the body cap 9 is pushed against the open end of the passage of the valve body 1 via the O-ring 8, and thus the respective end faces of the valve body 1 and the body cap 9 are brought into strong contact with each other.

Figure 5:
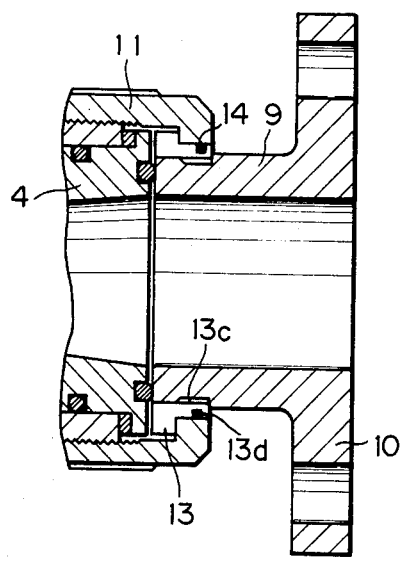
FIG. 5 is a vertical sectional elevational view of the principal part of a second embodiment of the present invention.
Figure 6:
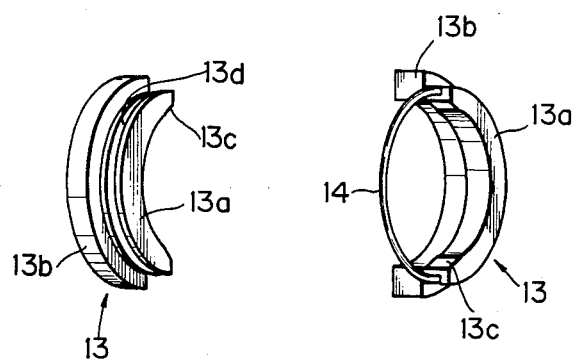
FIG. 6 is an exploded perspective view of a split ring of the second embodiment of the present invention.

FIGS. 5 and 6 show a second embodiment of the present invention. In this embodiment the ring elements 13, 13 are slightly altered. That is, the ring element 13 is provided with an annular groove 13d on the outer surface of the fitting projection 13a, and when the ring elements 13, 13 are fitted into the annular groove 9a, an O-ring composed of rubber-like elastic material or a resilient metallic split ring 14 or the like is fitted into the annular groove 13d. According to the above construction of the ring elements 13, 13, when the ring elements 13, 13 are fitted into the annular groove 9a of the body cap 9, the ring elements 13, 13 will not fall off.

The present invention is not limited to the abovementioned embodiments, but, for example, the ring elements 13, 13 may be adhered to the body cap 9 by adhesive in the state of fitting the ring elements 13, 13 into the annular groove 9a. In this way, the mechanical strength of the flanged valve can be further increased.

The material of the ring element 13 is generally the same as that of the body cap 9 and valve body 1, but other materials having an excellent mechanical strength also can be used. Further, the split ring 12 can be composed of three divided ring elements. Furthermore, the cross section of the ring element 13 is not limited to the shape of the above embodiments, it may be any cross section, if the fitting projection 13a and the collar-like projection 13b form almost annular projections, respectively, when these ring elements 13, 13 form a ring 12 by confronting each end face.

According to the present invention, assembling can be carried out easily and no tool is required for assembling. The valve body and the body cap can be simply connected to each other by screwing the cap nut on the valve body, and consequently, a flanged valve having a high mechanical strength can be provided. Also, disassembling of the flanged valve can be carried out easily in the same manner as assembling.

It is to be understood that the present invention may be embodied in other specific forms without departing from the spirit or essential characteristics of the present invention. The preferred embodiments are therefore to be considered illustrative and not restrictive. The scope of the invention is indicated by the appended claims rather than by the foregoing descriptions and all changes or variations which fall within the meaning and range of the claims are therefore intended to be embraced therein.

We claim:

1. A flanged valve comprising:
   a valve body having an axially directed, open end portion and a threaded region on an outer surface of said open end portion, said valve body containing a valve member therein;
   a cylindrical body cap having an inside end portion and an outside end portion, said inside end portion closer to said valve member than said outside end portion, said inside end portion bearing on said open end portion of said valve body, said body cap provided with a radially outwardly directed flange integral therewith on the outside end portion of said body cap;
   a cap nut having an inside and an outside end portion, said inside end portion closer to said valve member than said outside end portion, said outside end portion provided with a radially inwardly directed annular rib, said cap nut having a threaded portion on a radially inner surface of its inside end portion, said annular rib positionable with clearance about said inside end portion of said body cap;
   said body cap provided with an annular groove on a radially outer surface of the inside end portion thereof;
   a split ring positioned about said body cap, said ring split at circumferentially spaced locations to form at least two, partial ring elements having opposing end portions, each ring element provided with a radially inwardly directed fitting flange which engages said annular groove, said fitting flanges having beveled regions adjacent said opposing end portions, each ring element provided with a radially outwardly directed projection having a diameter larger than a radially inner diameter of said annular rib of said cap nut, said outwardly directed projection located closer to said valve member than said fitting flange;
   whereby said ring elements may be fitted upon said body cap while said cap nut is positioned about said inside end portion of said body cap without substantial interference between said fitting flanges and said inner end of said body cap and whereby said body cap is connected with said valve body by pushing said annular rib of said cap nut against said outwardly directed projection of said split ring and by screwing said threaded portion of said cap nut on said threaded region of said valve body.

2. The flanged valve according to claim 1, wherein said each ring element is provided with an annular groove on a radially outer surface of said fitting flange and an O-ring or a split ring is fitted into said annular groove of said ring element.

3. A flanged valve according to claim 1, wherein said valve member is a ball valve member.

4. A flanged valve according to claim 2, wherein said valve member is a ball valve member.

* * * * *